Aug. 21, 1923. 1,465,811
L. DORÉ
CULTIVATOR
Filed Jan. 26, 1921 2 Sheets-Sheet 1

Inventor
Louis Doré,
By
Attorney

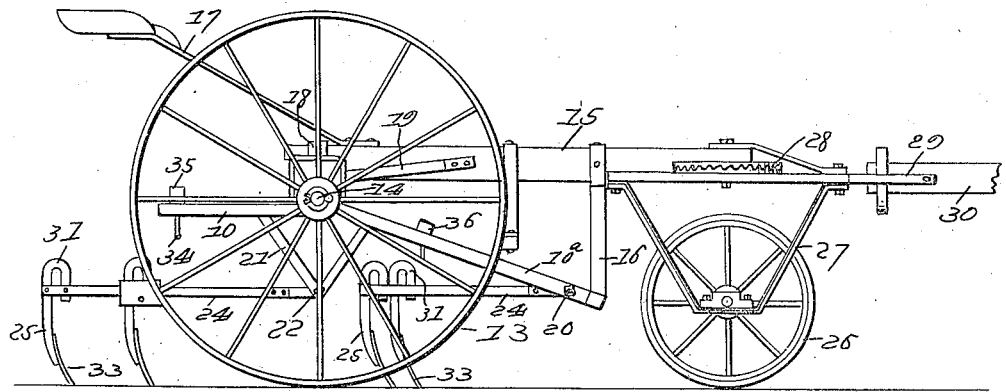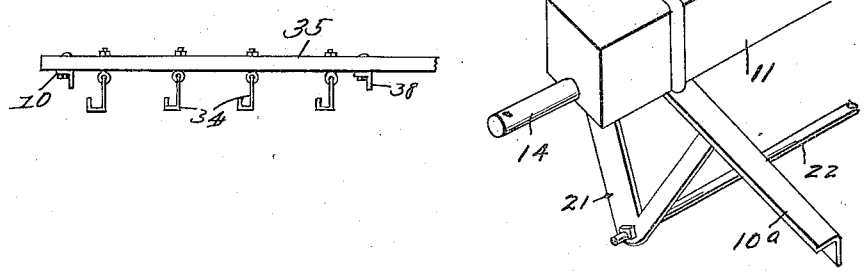

Patented Aug. 21, 1923.

1,465,811

UNITED STATES PATENT OFFICE.

LOUIS DORÉ, OF SNOQUALMIE FALLS, WASHINGTON.

CULTIVATOR.

Application filed January 26, 1921. Serial No. 440,078.

*To all whom it may concern:*

Be it known that I, LOUIS DORÉ, a citizen of the United States of America, residing at Snoqualmie Falls, in the county of King and State of Washington, have invented new and useful Improvements in Cultivators, of which the following is a specification.

The object of the invention is to provide a relatively simple and efficient construction of cultivator for preparing the surface of soil for seeding and adapted to operate under such conditions as to insure a uniform action upon all portions of the surface traversed by the machine, to the end that soil of which the surface is uneven may be cultivated to a uniform depth; and furthermore to provide means whereby the cultivating or soil working elements may be separately or independently withdrawn from operative relation with the soil to provide spaces to correspond with rows of growing plants or crops between which it is desired to cultivate the soil without disturbance of or injury to the plants; and furthermore to provide a device which will combine the functions of a cultivator and weeder, in that it will cultivate and weed the ground at the same time and with these objects in view the invention consists in a construction and combination of parts of which a preferred embodiment is shown in the drawing, wherein:

Figure 2 is a side view of the same.

Figure 3 is a detail view of a portion of one of the hanger bars.

Figure 4 is a view in perspective of a portion of the frame showing the means for supporting the rear series of draw bars.

Figure 1:
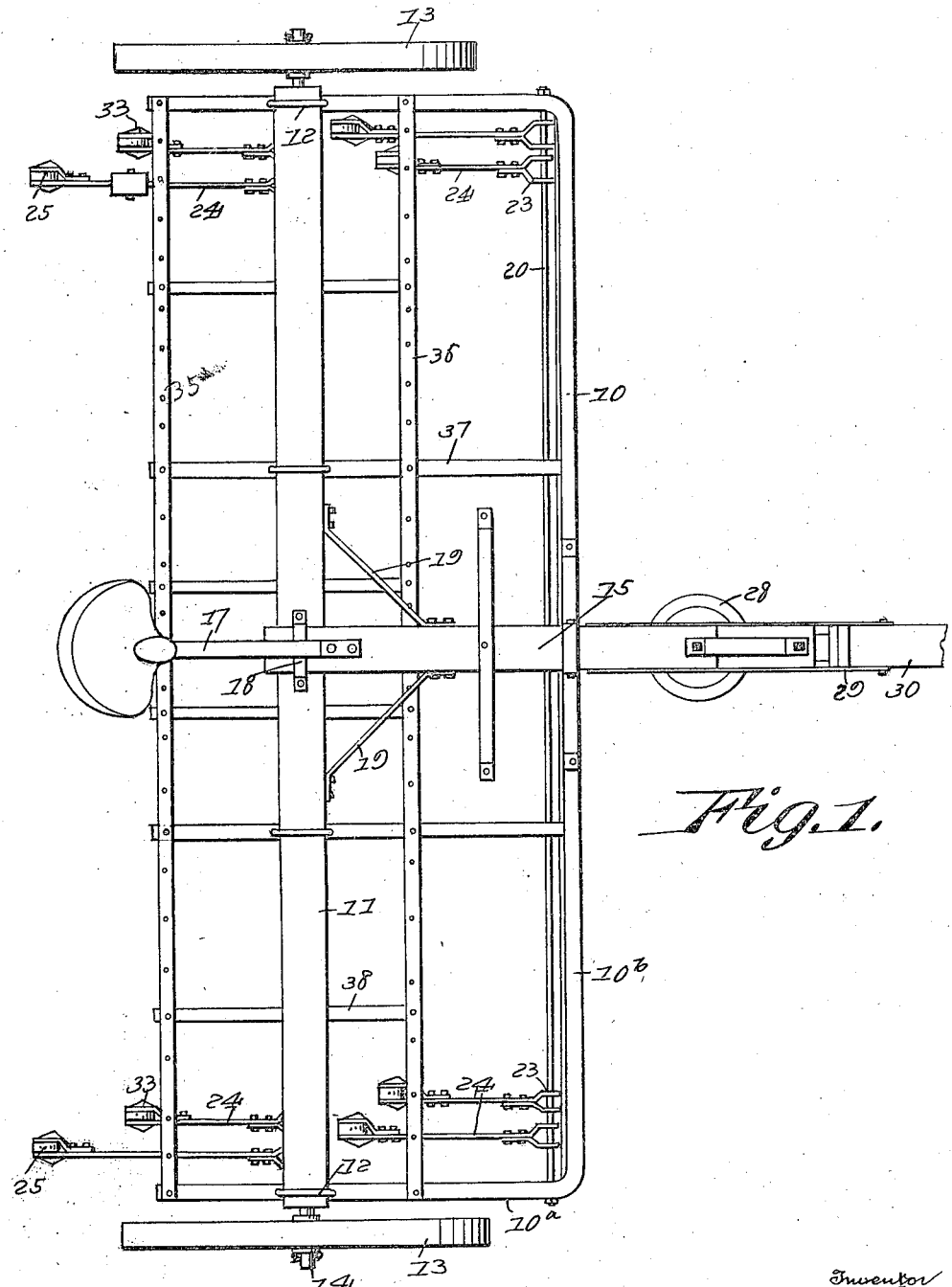
Figure 1 is a plan view of the machine.

The frame of the machine preferably consists of the marginal beam 10 of angle bar form having the extremities of the axle 11 secured thereto as by means of clips 12, the ground wheels 13 being mounted upon spindle portions 14 at the ends of said axle the portions of the side members 10ª of said beam in front of the plane of the axle being inclined downward to position the front transverse portion 10ᵇ thereof below the plane of the stub tongue 15 which is attached at its rear end to and extends forwardly from the axle, the forward depressed portion of said marginal frame being supported from the stub tongue by a hanger 16 as shown clearly in Figure 2. The seat standard 17 may be attached as shown to the rear end of the stub tongue which is secured to the central portion of the axle by a clip 18 and is strengthened by the diagonally disposed forwardly extending braces 19.

Parallel with the transverse front member of the depressed forwardly extending portion of the marginal frame is a fulcrum rod 20 while in rear of and parallel therewith, and supported by suitable hangers 21 is a similar fulcrum rod 22, said fulcrum rods being designed for engagement by the bifurcated or yoke shaped portions 23 of front and rear series of draw bars 24 which carry the plow or shovel standards 25, to the end that while the yokes at the forward ends serve to properly space the draw bars transversely with reference to the path of the cultivator, free vertical swinging movement of the draw bars independently of each other is permitted, to the end that the plows or shovels carried by the standards at the free rear ends thereof may follow accurately the inequalities or irregularities of the soil traversed by the machine to insure a uniform depth of cultivation regardless of such irregularities.

In the construction illustrated a pilot or colter wheel 26 is mounted in a depending colter frame 27 connected by a fifth wheel 28 with the forward end of the stub tongue, said colter frame being provided with a forward extension 29 for attachment to the draft tongue 30.

The plow or shovel standards are preferably looped at their upper ends as shown at 31 and the loops are attached at their front and rear sides of rivets 32 in the split or divided rear ends of the draw bars, to afford a forward and rearward resilience or spring quality to the standards to cushion strains or jars due to the contact of the cultivator shovels 33 with obstacles in the paths of their movement, said loops also forming convenient handles or grips by which the rear ends of the draw bars with the attached standards may be manually raised for engagement with hanger hooks 34 supported by transverse hanger bars 35 and 36 disposed above the planes of and respectively in rear of the fulcrum rods 22 and 20 said hanger hooks being loosely connected with the hanger bars and adapted to support selected members or all of the draw bars in an elevated or inoperative position, it being obvious that such support is desirable in moving the machine from one field of operation to another and the support of selected bars being desirable when soil is being cultivated between parallel rows of growing plants, to avoid the disturbance or injury of the plants. The rear hanger bar 35 is terminally attached to and supported by the rearwardly extending portions of the side members of the marginal frame beam while the forward hanger bar is terminally attached to and supported by the downwardly and forwardly inclined front portions of the side members of said marginal frame.

The marginal frame may be longitudinally strengthened by braces 37 and 38, the former of which extend from the rear hanger bar 35 to the front member 10$^b$ of the marginal frame while the latter extend from the rear hanger bar to the front hanger bar, the braces 27 being intermediately attached to the axle.

Having described the invention, what is claimed as new and useful is:—

A cultivator having a marginal frame beam having parallel side members and a connecting front member, a transverse axle secured to the side members of the marginal frame between the front and rear ends thereof and having supporting wheels mounted upon spindles at the extremities thereof, said marginal frame being downwardly and forwardly inclined in advance of the plane of the axle, a stub tongue secured at its rear end to the axle and connected with the transverse front member of said marginal frame by a hanger, and front and rear series of independent standard carrying draw bars fulcrumed upon said frame, the said series of draw bars being connected with the frame by transverse fulcrum rods the front rod connecting the side portions of the marginal frame and the rear rod being carried by hangers depending from said side portions in the plane of the axle.

In testimony whereof he affixes his signature.

LOUIS DORÉ.